(12) United States Patent
Trivedi et al.

(10) Patent No.: US 9,721,009 B2
(45) Date of Patent: Aug. 1, 2017

(54) PRIMARY AND FOREIGN KEY RELATIONSHIP IDENTIFICATION WITH METADATA ANALYSIS

(71) Applicant: TATA CONSULTANCY SERVICES LIMITED, Mumbai (IN)

(72) Inventors: Keval K. Trivedi, Junagadh (IN); Shweta S. Karkhanis, Pune (IN); Akshay P. Bharadwaj, Jamnagar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 326 days.

(21) Appl. No.: 14/640,969

(22) Filed: Mar. 6, 2015

(65) Prior Publication Data

US 2015/0254255 A1 Sep. 10, 2015

(30) Foreign Application Priority Data

Mar. 6, 2014 (IN) ............................ 773/MUM/2014

(51) Int. Cl.
*G06F 17/30* (2006.01)
(52) U.S. Cl.
CPC ...... *G06F 17/3074* (2013.01); *G06F 17/3053* (2013.01); *G06F 17/30303* (2013.01); *G06F 17/30315* (2013.01); *G06F 17/30864* (2013.01); *G06F 17/30985* (2013.01)
(58) Field of Classification Search
CPC ............. G06F 17/3074; G06F 17/3053; G06F 17/30864; G06F 17/30985; G06F 17/30315

USPC .................................................. 707/E17.095
See application file for complete search history.

(56) References Cited

FOREIGN PATENT DOCUMENTS

IN 2811/MUM/2012 3/2014
WO 2006/103398 A1 10/2006

OTHER PUBLICATIONS

Rahm et al., "A survey of approaches to automatic schema matching," The VLDB Journal 10:334-350, 2001.
Giunchiglia et al., "Semantic Matching," Technical Report #DIT-03-013, University of Trento, Department of Information and Communication Technology, Apr. 2003, 18 pages.

*Primary Examiner* — Kris Mackes
*Assistant Examiner* — Soheila (Gina) Davanlou
(74) *Attorney, Agent, or Firm* — Seed IP Law Group LLP

(57) ABSTRACT

A method for identifying a primary key relationship using metadata of a data source is described herein. In an implementation, the method includes identifying a pair of metadata from the data source for comparison. A phonetic code of each of the pair of metadata is determined Further, the phonetic code of the pair of metadata is compared to determine a phonetic disparity score. A string sequence of the pair of metadata is compare to determine a string comparison score. Further a compliance to a predefined set of constraints are checked for the pair of metadata, and a primary key and foreign key relationship is determined based on the phonetic disparity code, string comparison code and compliance of the pair of metadata to a predefined set of constraints.

17 Claims, 2 Drawing Sheets

PRIMARY AND FOREIGN KEY RELATIONSHIP IDENTIFICATION WITH METADATA ANALYSIS

TECHNICAL FIELD

The present subject matter relates, in general, to identifying primary key and foreign key relationship in data sources, and in particular to identifying primary and foreign key relationship using metadata in structured data sources.

BACKGROUND

Data sources refer to digitized data that are in the form of data streams, data files, and databases. The information available to people and the information required by people is growing everyday because of advancement in information and communication technology. Data sources are used to store the information generated everyday and subsequently retrieve the stored information. Therefore, care is taken to store information efficiently to enable ease of access.

Data sources in form of databases have been used for several years. Various data structures are used to store information, where the data structure is dependent upon application of the data structure. Data structures are used to ensure that accessibility of data from data sources to make information accessible.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference like features and components. Some embodiments of systems and methods in accordance with embodiments of the present subject matter are now described, by way of example only, and with reference to the accompanying figures, in which.

DETAILED DESCRIPTION

Figure 1:
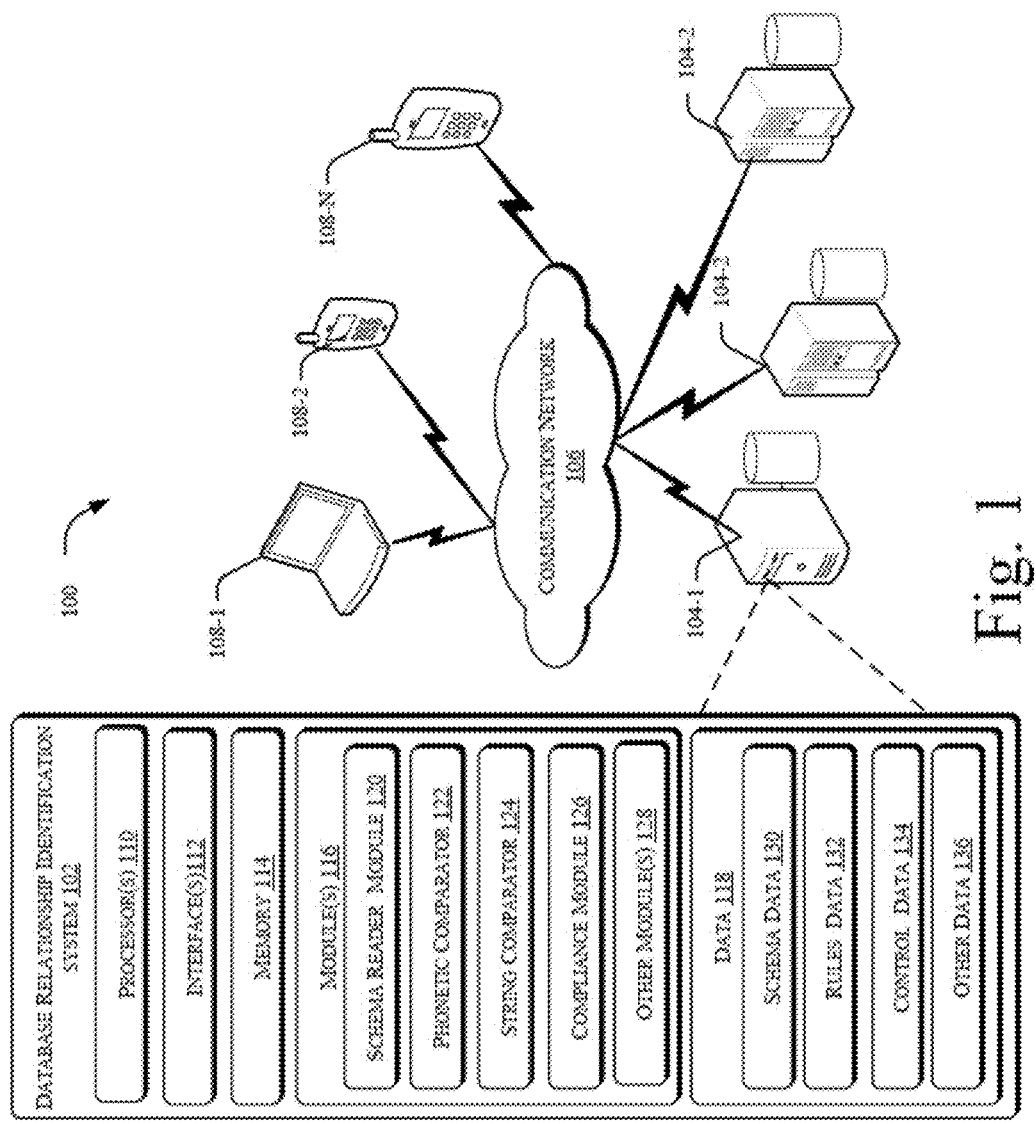
FIG. 1 illustrates an exemplary network implementing a system for database relationship identification.

Systems and methods for identifying a primary key and foreign key relationship in a database using metadata analysis are described herein. While the description has been provided with respect to structured databases, it may be noted that the same may be extended to semi structured databases, wherein data elements are specified with the help of metadata. The term database has been used to describe a data source. It may be appreciated that the present subject matter may also be used for other structured data sources defined using metadata. Further, data structures in a structured database are referred to as tables.

The number of applications used in web related applications and other computer related applications are ever increasing and, correspondingly, the number of databases and the number of tables within a database are also increasing. With the increasing number of databases, increased amount of heterogeneity is observed in the databases. For example, the tables used to store data in databases have different data structures and further, the metadata used to define the table is also different.

Data integrity of databases that have heterogeneous table structures and metadata may be challenging to maintain. Data integrity refers to overall completeness, accuracy and consistency of data in databases. One aspect of data integrity is referential integrity where relationships across tables may be defined. One way of defining relationship across different tables in a structured database is by using a primary key and a foreign key. A primary key and a foreign key are two types of constraints for referential integrity, where primary key uniquely identifies each row of a table and the foreign key corresponding to the primary key may identify the corresponding rows in another table.

Conventionally, primary key and foreign key relationship is specified during the creation of tables in a database. However, some legacy databases do not support specifying the primary key and the foreign key relationship specification. These legacy databases are very popular owing to their simplicity of use, however, maintaining referential integrity by specifying primary key and foreign key constraints is not possible.

Further, in conventional systems, primary key and foreign key constraints may not be specified because of the impact on performance of the database. Specifically, when primary key and foreign key constraints are specified, any update of the database is verified for compliance with the primary key and foreign key constraints. The verification of compliance with the primary and foreign key causes the database updating process to become slower.

However, in conventional systems, relationships of data across tables may exist in databases, which have not been identified through the primary and foreign key for the above stated reasons. However, for ease of access of information, such database relationships may be identified, either while importing data from a legacy database or in databases where relationships were not identified earlier.

In some conventional systems, relationships of data across tables are identified by comparing the table data. Initially, a pair of columns of two tables of the database is identified. The values in each of the rows, also referred to as data elements, of one column in the pair of columns are compared to values in the other column to identify a pair of columns that have identical data elements or where the number of matches is a substantially high ratio. If the pair of columns is found to match then the corresponding columns to which the data elements belong will be treated as the primary key and foreign key. In such conventional systems, if the database is voluminous, then comparing the data elements of each column may be a time consuming and cumbersome process.

Certain other conventional systems utilize the metadata of columns, such as column name for comparison. The comparison of column names is conducted based on a name string matching algorithm. Such conventional systems may not accurately identify primary key and foreign key relationship, because the column name identified as the primary key may have repeating values in it, and may not satisfy the rules of primary key.

The present subject matter defines methods and systems required to identify the relationships in databases, not only to establish referential integrity in databases, but also to provide related data from the database, where the data from a table may be correlated to data from another table. More specifically, the methods and system of the present subject matter identify the primary key and the foreign keys of a database using metadata of each of the tables in the database.

The present subject matter defines methods and systems where the primary key and foreign key are identified by using metadata of the tables. More specifically, column names of tables are used for comparison.

Column names may be read from the schema of a database. A pair of column names may be identified and the identified column names may be compared by using a phonetic matching algorithm to check whether the column names match. A phonetic matching algorithm compares the pronunciation of each column name. Phonetically matching words are words which when pronounced sound similar.

Further, string comparison may also be performed on the pair of column names using a string comparison algorithm. Based on a score generated by string comparison algorithm, the pair of column names may be verified against a set of rules to determine whether the pair of columns may be determined as the primary key and foreign key for the given database. In case the pair of columns does not satisfy one or more rules in the set of rules, then the pair of column names may not be identified as the primary key and the foreign key, even if the phonetic algorithm and string match algorithm return positive results.

By using the present subject matter, the number of false positives is reduced in multiple steps. False positives refer to the results that have been returned as potential matches, but where the pairs of columns do not form a primary key and foreign key relationship. According to the present subject matter, the phonetic algorithm is first executed to identify strings that sound similar. The phonetically matching pairs of column names are then subjected to string matching algorithm, where the spelling of the pair column names are matched with each other. This step removes the strings that sound phonetically similar, but are spelt differently. The phonetic algorithm and the string matching algorithm complement each other in removing false positives. For example, consider a pair of column with names "department id" and "apartment id" have similar phonetic sound, but are spelt differently. Hence according the present subject matter the phonetic algorithm may identify the pair of column names as sounding similar, but the string matching algorithm may not find the pair of column names to have matching spellings, hence the column pair may not be identified as primary key and foreign key pair.

In another example, consider a pair of columns with names "number of synchronous modules" and "number of asynchronous modules". A string comparison performed in accordance to a string comparison algorithm may return a result indicating a match between the pair of columns, however, a phonetic algorithm may return a difference, and hence the column pair may not be identified as primary key and foreign key.

Further the pair of column names that are found to be phonetically and string comparatively matching, are then verified against specific rules that will identify whether a primary key and foreign key relationship can exist between columns identified by the column names. The set of rules may include rules to verify whether values in a column identified as primary key are non-repeating. This step of checking for compliance of columns against a primary key and foreign key definition serves as a step where column names that not only match phonetically and string match, which together confirm a syntactic match, but also check for adherence to database integrity by verifying database rules adherence.

Further, from the above process it may be observed, that since only the schema of the database is used for identification of the primary key and foreign key, the method and systems implementing the process described herein are not time consuming. Further with the removal of false positives, and checking for adherence of rules while identifying the primary key and foreign key gives accurate results.

Figure 2:
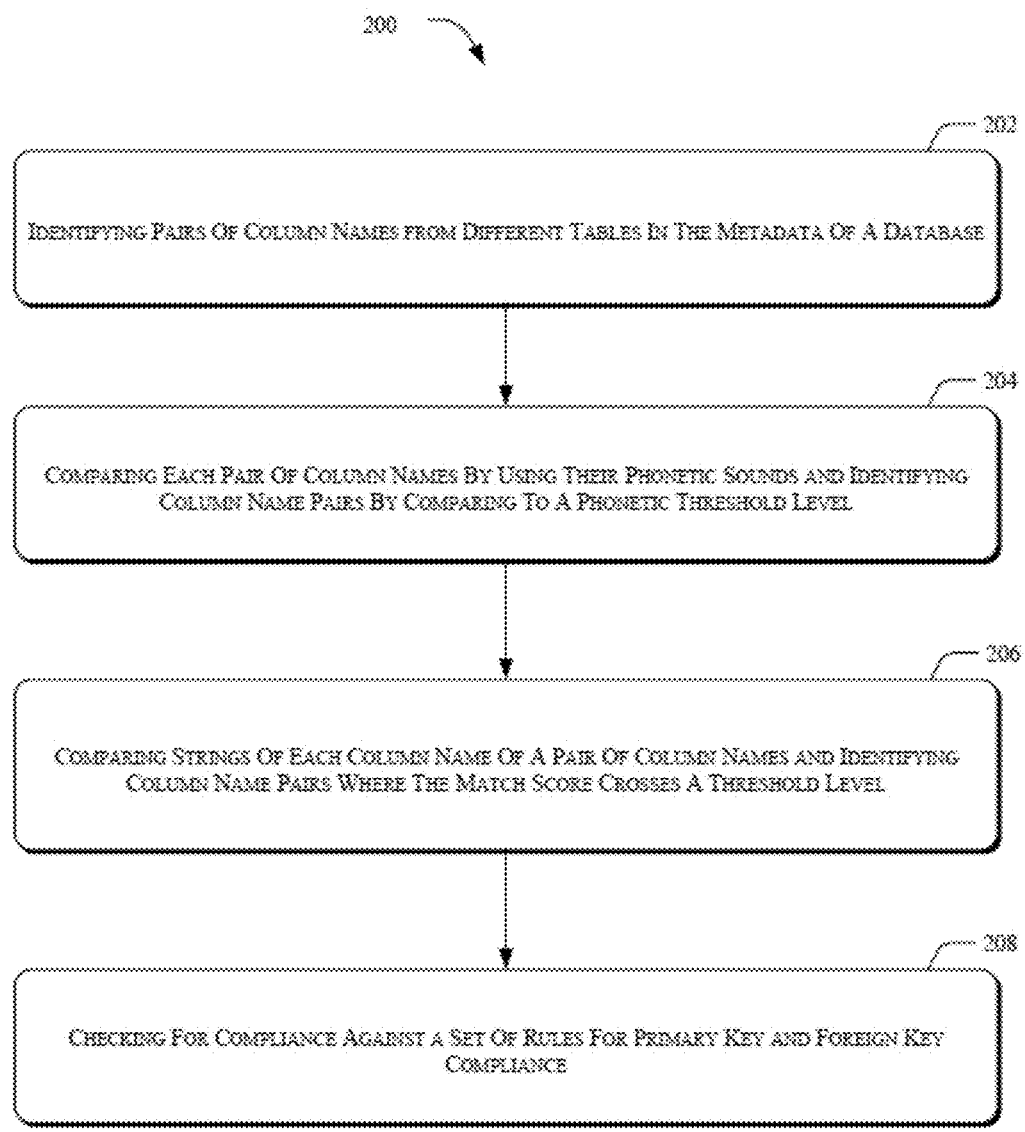
FIG. 2 illustrates an exemplary method for identifying relationships in a database.

The manner in which the systems and methods for primary key and foreign key identification based on metadata shall be implemented has been explained in details with respect to the FIG. 1 and FIG. 2. While aspects of the described systems and methods for primary key and foreign key identification can be implemented in any number of different computing systems, communication environments, and/or configurations, the embodiments are described in context of the following exemplary system(s).

It will also be appreciated by those skilled in the art that the words during, while, and when as used herein are not exact terms that mean an action takes place instantly upon initiating an action but that there may be some small but reasonable delay, such as a propagation delay, between the initial action, and the reaction that is initiated by the initial action. Additionally, the word "connected" and "coupled" is used throughout for clarity of the description and can include either a direct connection or an indirect connection.

FIG. 1 illustrates a communication environment implementing Database Relationship Identification System 102 for primary key and foreign key identification over a communication network 106. In one implementation the Database Relationship Identification System 102 is connected to one or more database servers 104-1, 104-2, . . . 104-N over a communication network 106. The database servers 104-1, 104-2, . . . , 104-N is individually referred to as database server 104 and commonly referred to as database servers 104 hereinafter. It will be appreciated by person skilled in the art that each database server 104 may be associated to database, for storing data, and a database administration system. The Database Relationship Identification System 102 may use interfaces from database server 104 to retrieve information from the database associated with the database server 104.

The database servers 104 of the Database Relationship Identification System 102 can be implemented using a variety of devices, such as desktop computers, mobile personal gadgets, networked intelligence devices, building-automation devices, cellular phones, tablet computers, Machine-to-Machine (M2M) devices, hand-held devices, laptops or other portable computers, workstations, mainframe computers, servers, and the like. The Database Relationship Identification System 102 described herein, can also be implemented in any network environment comprising a variety of network devices, including routers, bridges, servers, computing devices, storage devices, etc. The Database Relationship Identification System 102 may be implemented in database servers 104 or may be implemented in other computing systems at different geographic locations as compared to that of the database servers 104. A Database Relationship Identification System 102 which is located outside the database server 104 may communicate with the database server 104 over the communication network 106 to retrieve data from the database server 104. Further, the database servers 104 may themselves be located either within the vicinity of each other, or may be located at different geographic locations.

Client devices 108-1, 108-2, . . . , 108-N, collectively referred to as client devices 108 may communicate with the Database Relationship Identification System 102 which is coupled with the database servers 104. The client devices 108 may be desktop computers, mobile personal gadgets, networked intelligence devices, building-automation devices, cellular phones, tablet computers, Machine-to-Machine (M2M) devices, hand-held devices, laptops or other portable computers, landline phones, workstations, mainframe computers, servers, and the like. The client devices 108 may provide interfaces to communicate with corresponding interfaces in the Database Relationship Identification System 102. In one implementation, the Database Relationship Identification System 102 may be implemented on the client device 108, and the client device may communicate with the database server 104 over the communication network 106 to retrieve data requested by the client device 108 from the database server 104.

Users of Client devices 108 who may communicate with the Database Relationship Identification System 102 may include database administrators, system administrators, database maintenance personnel or any other person having access rights to perform database administration activities. The users of client devices 108 are generally referred to as users. Users may use interfaces provided on the client devices 108 to interact with the Database Relationship Identification System 102.

The communication network 106 may be a wireless or a wired network, or a combination thereof. The communication network 106 can be a collection of individual networks, interconnected with each other and functioning as a single large network (e.g., the internet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Wi-Fi, Bluetooth, ZigBee, GPRS, Internet, and RAN and Integrated Services Digital Network (ISDN). Depending on the technology, the communication network 106 may include various network entities, such as gateways, routers; however, such details have been omitted for ease of understanding.

In one implementation, the data relationship identification system 102 includes a processor 110. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

Also, the Database Relationship Identification System 102 includes interfaces 112. The interfaces 112 may include a variety of software and hardware interfaces that allow the Database Relationship Identification System 102 to interact with the client devices 108 over the communication network 106. The interfaces 112 may facilitate multiple communications within a wide variety of networks and protocol types, such as communications network 106, including wire networks, for example, LAN, cable, etc., and wireless networks, for example, WLAN, cellular, satellite-based network, etc.

The Database Relationship Identification System 102 may also include memory 114. The memory 114 may be coupled to the processor 110. The memory 114 can include any non-transitory computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the Database Relationship Identification System 102 may include module(s) 116. The Database Relationship Identification System 102 may further include data 118. The module(s) 116 may be coupled to the processors 110 and amongst other things, include routines, programs, objects, components, data structures, etc., which perform particular tasks or implement particular abstract data types. The module(s) 116 may also be implemented as, signal processor(s), state machine(s), logic circuitries, and/or any other device or component that manipulate signals based on operational instructions.

In an implementation, the module(s) 116 include Schema Reader Module 120, Phonetic Comparator 122, String Comparator 124, Compliance Module 126, and other module(s) 128. The other module(s) 128 may include programs or coded instructions that supplement applications or functions performed by the Database Relationship Identification System 102. In said implementation, the data 118 includes Schema Data 130, Rules Data 132, and Control Data 132, and Other Data 136. The other data 136, amongst other things, may serve as a repository for storing data that is processed, received, or generated as a result of the execution of one or more modules in the module(s) 116. Although the data 118 is shown internal to the Database Relationship Identification System 102, it may be understood that the data 118 can reside in an external repository (not shown in the figure), which may be coupled to the Database Relationship Identification System 102 or a part of the database servers 104. The Database Relationship Identification System 102 may communicate with the external repository through the interface(s) 112 to obtain information from the data 118.

In accordance with an implementation of the present subject matter, the Database Relationship Identification System 102 is explained. It will be appreciated that although the description details the Database Relationship Identification System 102 as coupled to the database servers 104, the Database Relationship Identification System 102 may be implemented as a service in a cloud network, where the service interacts with the database servers 104 to retrieve data. Alternatively, the Database Relationship Identification System 102 may also be implemented in the client devices 108, and the Database Relationship Identification System 102 may contact the database servers 104. The implementation described herein is an embodiment and is not limiting.

The structure of each database associated with the database server 104 is generally defined using a database schema. A database schema is a definition in a formal language of how the database is organized and structured. In case of relational databases, the database schema is defined as one or more tables. In case of relational databases, the database schema represents data in a tabular format. That is, the data is organized into multiple columns, wherein each column represents an attribute. Each of the columns is identified by a column name. Further, each row of the table represents a record having the values for one or attributes represented by the column names. Each value in a record is referred to as column value.

Each database is associated to metadata. Metadata refers to information stored that describes the data that is stored in the database. Therefore, column names are a part of metadata. Metadata may also comprise several other bits of information, such as description of the tables, which are outside the scope of the present subject matter, and hence not described in detail. Further, each database may have multiple such tables, each storing various different aspects of data. For example, a database for storing employee related information may comprise a table for employee's personal details, a table for employees project related details, and a table for employee's payroll details.

The database may also include a primary key and a foreign key. The primary key and the foreign key are used to correlate the data across tables of a database. A primary key is a column or a combination of columns, which can uniquely identify a record of a table in the database. The table comprising the primary key is referred to as the parent table. A foreign key is the column or combination of columns for identifying a record or multiple records in another table, where the record or multiple records correspond to record identified by the primary key. The table or tables comprising foreign key is referred to as referenced table.

The following example is used to enhance the understanding of the terms used above. A database comprising employee details is considered. The database comprises tables of the structure shown below.

TABLE 1

Employee Professional Details

| Employee Id | Project Details | Cost to Company | Employee designation | Employee Grade |
|---|---|---|---|---|
| T11 | P1 | X | Sr Manager | Grade C |
| T21 | P2 | Y | Jr Manager | Grade B |

TABLE 2

Employee Personal Details.

| Emp Identifier | Name | Address | Mobile number | passport details |
|---|---|---|---|---|
| T11 | Employee 1 | #1, Haddows Street | (xxx-yyy) | A999999 |
| T21 | Employee 2 | #1, Maple Street | (aaa-bbb) | Z888888 |

TABLE 3

Employee electronic equipment Details.

| Emp Id | Type | Brand | Model Number | Serial number |
|---|---|---|---|---|
| T11 | Laptop | ABC | 111 | A#123 |
| T11 | Desktop | ABC | 113 | Z#132 |
| T21 | Laptop | DEF | P1245E | PE#12 |
| T21 | Mobile | MMM | MSupra | IE999 |

The employee database comprises of the above mentioned tables, that is, Table 1, Table 2, and Table 3. Table 1 represents professional information with regard to the employee, and Table 2 refers to personal information of the employee, and Table 3 comprises details of the electronic equipments allotted to an employee. The column names of Table 1 are employee id, project details, cost to company, employee designation, and employee grade, column names of Table 2, namely employee id, name, address, mobile number, passport details together form the metadata, and column names of Table 3 are Type, Brand, model number, and serial number. The column names of each table form the metadata, or the data that is used to describe data within a table. The database schema includes the structure of the three tables, metadata, etc. Each row of each table, for example T21, P2, Y, Jr Manager, Grade B represents a record.

Further, in the example described above, Employee Id of Table 1 may be identified as the primary key. In one instance, the primary key corresponds to the Value T21 and the record (P2,Y, Jr Manager, Grade B). The foreign key in Table 2 is identified as Emp Identifier, and the foreign key in Table 3 is emp id. In Table 2, the foreign key, emp identifier corresponding to primary key T21 identifies the record (T21, Employee 2, #1Maple Street, aaa-bbb, Z888888)., and the foreign key Emp id corresponding to primary key T21 of Table 3 identifies two records (T21, Laptop, DEF, P1245E, PE#12), and (T21, Mobile, MMM, MSupra, 1E999).

As can be observed from the table above, the column names of the primary key and foreign key do not match, although they refer to the same entity. Using the database to get coherent information, we may start with a column value of primary key of Table 1, say T21 which is the column value for Primary key Employee Id in Table 1. By using the primary key against the foreign key in Table 2 and Table 3, it may be read that employee with employee id T21, has the following personal record Name: Employee 2
Address: #1, Maple Street
Mobile Number: (aaa-bbb)
Passport details: Z888888

Further the employee with Employee id T21 has been allotted one Laptop of DEF Brand and P1245E model, with PE#12 serial number. Employee with Employee id T21 has also been allotted a mobile of MMM, with Model MSupra and Serial number 1E999. As evident from the example above, establishing the primary key and foreign key helps in specifying meaningful relationships.

However, it may be appreciated by a person skilled in the art, that under certain circumstances and conditions, primary key and foreign keys may not have been specified in several databases. There may be legacy databases that do not allow specification of primary key and foreign key. However, these legacy databases may be imported into other database management systems which permit specification of primary key and foreign key.

Further, database designers may have had considered performance deterioration because of verification against primary key and foreign key rules while updating the database and hence may not specify primary key and foreign key.

However, it may be appreciated that identifying primary key and foreign key are used for maintaining referential integrity. Referential integrity is used to maintain consistency in relationship between tables of a database. In one example, referential integrity exists in a database when a column value of a foreign key references a column value of the primary key. Therefore, for maintaining referential integrity primary key and foreign key are to be identified if it is not already specified.

In systems where database schemas are defined and databases are already populated without specifying primary key and foreign key, referential integrity may be ensured by the specification and use of primary key and foreign key.

The present subject matter proposes a system and a method to identify primary key and foreign key relationships from databases. According to one implementation, the present subject matter identifies column names from different tables for identifying primary key and foreign key. The column names are then compared by performing a phonetic comparison on the column names. On identifying a substantial match, the present subject matter compares the strings of the column names for a match. If both the phonetic comparison and string comparison provide information about substantial similarity between the column names, compliance of the identified pair with constraints applicable for primary key and foreign key is checked. As mentioned earlier, the present subject matter use a plurality of checks, such as phonetic comparison, string comparison and compliance to rules to reduce the number of false positives, and thereby increase the probability of a primary key and foreign key match. Constraints for primary key and foreign key may comprise a constraint that the value of a primary key is unique across all records in a table. Another constraint for primary key and foreign key may be that foreign key is not NULL.

The system implementing the above method and other details are described below. The execution of the Database Relationship Identification System 102 may begin with the execution of the Schema Reader Module 120. As an initial step of execution, the Schema Reader Module 120 reads the schema of the database and identifies the column names within the schema.

In one implementation, the Schema Reader Module 120 may take as input the database identifier and provide an output which comprises the metadata of the database. The output may be structured to provide the table name and the column names within each table.

Based on the identified column names of each table, as a subsequent step, the Schema Reader Module 120 may identify various pairs of column names for identifying if the column name pairs have a primary key and foreign key relationship between them. In one implementation, the Schema Reader Module 120 may provide an exhaustive list of all pairs of column names, where each column name of the pair belong to different tables in the database. Alternatively, the Schema Reader Module 120 may also be configured with pre-defined rules which may be executed for identifying column pairs. An example it may be possible to specify only selected tables in the database for identifying a relationship.

Further, the pairs of column names identified by the Schema Reader Module 120 may be stored in a Universal set of pair of column names.

The Phonetic Comparator 122 receives one or more pair column names from the Universal set for phonetic comparison. The Phonetic Comparator 122 uses the pronunciation of words for comparison. It may be appreciated that the natural pronunciation of words may not be phonetically intuitive, especially in the English language. For example, the word 'because' may be pronounced as 'becos' or 'becoz', but the spelling or structure of the word is not intuitive of the pronunciation.

In one implementation, the Phonetic Comparator 122 uses a commercially available phonetic comparing tool. One example of a commercially available phonetic comparing tool, such as Phonetic comparing tool implementing a phonetic matching algorithm like Soundex. Such Phonetic Comparators 122 generates an alphanumeric code for each string, and the alphanumeric code of each column may be compared to each other to identify similar sounding column names. For example, the output of the Phonetic Comparator may be a combination of alphabets and numbers which represent the word either wholly or partially.

In one implementation, a phonetic threshold may be specified which indicates an acceptable level of phonetic disparity between column names. Further, phonetic disparity score may be computed by performing a mathematical operation on the alphanumeric code generated for each of the column names of the pair of column names by the Phonetic Comparator 122.

In another implementation, the module Phonetic Comparator 122 may be implemented an algorithm for phonetic comparison which uses the consonants of the column names to compare the sound of the pair of column names and provide a phonetic disparity code.

In one implementation, the Phonetic Comparator 122 identifies phonetically acceptable column name pairs by checking whether the phonetic disparity score is phonetically acceptable when compared to the phonetic threshold.

For example, the Schema Reader Module 120 may identify pairs of column names, one pair identified may be employee id, and emp id, and the other pair identified may be mobile number and model number. One implementation of the Phonetic Comparator 122 may identify both the pairs mentioned as a match.

If the Phonetic Comparator 122 identifies that the pair of column names is acceptable then the pair of column names is added to a set referred to as MATCHSET. MATCHSET is a subset of the universal set comprising all column name pairs which are phonetically similar. It may be appreciated that the MATCHSET may comprise potential primary key and foreign key pairs. MATCHSET may also comprise pairs of column names which are not a potential primary key and foreign key pair. The pairs of column names that are a part of MATCHSET, but are not potential primary key and foreign key pair are referred to as false positives. False positives may occur in the MATCHSET because the column names sound similar, but do not refer to columns with corresponding values. For example, using Phonetic Comparator 122, the pair employee id, and emp id, and the pair mobile number and model number may be added into MATCHSET after finding the pair to be phonetically matching. However, it may be appreciated that employee id, and emp id may refer to the same attribute across different tables. However, mobile number and column name model number referring to a model number of an electronic device may be a false positive. The column mobile number refers to a mobile phone number, and the column model number refers to model number of an electronic gadget. So, it may be appreciated that since they identify different values, the column pair mobile number and model number may be considered a false positive.

In one implementation, after a result has been appended into MATCHSET, the module String Comparator 124 is invoked to perform a string comparison on the column name pair entered into the MATCHSET. In another implementation, the Phonetic Comparator 122 may construct the MATCHSET by including phonetically acceptable pairs after comparing all pairs of column names of the universal set of column name. The set of phonetically matching strings comprised in MATCHSET is used as input to the String Comparator 124.

The String Comparator 124 considers each pair of column names for comparing the pair of column names from the MATCHSET. In column name comparisons, the alphanumeric characters that constitute the column names are compared to arrive at whether the column names match. Examples of column names with alphanumeric characters are Name1, and Name2 to denote the first name and second name of a person. In one implementation, the String Comparator 124 compares one or more alphanumeric characters of each string with the other for comparison.

In one implementation, the String Comparator 124 may implement a string comparison to measure of the match between the two strings. To explain a little more in detail, the String Comparator 124 may compare the sequence of characters are organized in each column name. The String Comparator 124 may be invoked to identify whether similar alphanumeric characters are in corresponding position between the pair of column names. The combination of the alphanumeric character and the position is referred to as the sequence of characters of the column name. In another implementation, the String Comparator 124 returns a string comparison score indicating how many characters of the first string have to be replaced to arrive at the second string.

In another implementation, the String Comparator 124 may invoke a commercially available string comparison system implementing algorithms, such as KDIFF. In the given implementation, the String Comparator 124 returns a string comparison score which depicts the percentage match between the two strings. The percentage match may be a function of the number of alphanumeric characters in the similar position in the two strings that match.

A string threshold level may be configured in the String Comparator 124 to indicate an acceptable difference in the string structure of each of the pair of column names. Column name pairs for which the string comparison score is within the threshold level may be entered into a TENTATIVELIST. The set TENTATIVELIST comprises column name pairs where the String Comparator 124 has returned a result which crosses the threshold level. Therefore, the column name pairs for which the matching score of comparison of the pair of column name not within the threshold value are not entered into the TENTATIVELIST.

It may be appreciated that false positives, that is, column name pairs which were phonetically acceptable but where the string structure are different, are not entered into the TENTATIVELIST. The number of false positives is reduced by the execution of the String Comparator 124 on the MATCHSET, after comparing phonetically matching using the Phonetic Comparator 122.

In one implementation, the Universal set may work as input for both the Phonetic Comparator 122, and the String Comparator 124. Two temporary lists of column names may be filled by the Phonetic Comparator 122 and the String Comparator 124 based on the respective criterions of the Phonetic Comparator 122 and the String Comparator 124. After all the column name pairs have been compared, the column name pairs that are appearing in both temporary lists may be entered into TENTATIVELIST.

In another implementation, the String Comparator 124 may be executed prior to executing the Phonetic Comparator 122. In an example, one implementation of the String Comparator 124 may return a match between PAT, referring to profit after tax and VAT, referring to value added tax. In accordance to the said implementation, the String Comparator 124 may identify the column names pairs in the example as a potential match, however, the Phonetic Comparator 122 may return a result indicating that the column name pairs is not a match, and the column name pair may not be entered in the TENTATIVELIST It may be noted that the modules may be executed in any of the given manners without deviating from the scope of the present subject matter.

The set TENTATIVELIST comprising column name pairs that have the possibility of having a Primary Key and Foreign Key relationship are used as inputs to the Compliance Module 126. The Compliance Module 126 is configured to check for compliance to each column name pair in the TENTATIVELIST to a set of predefined constraints. The Compliance Module 126 identifies a column name pair that is compliant to the Primary Key and Foreign Key relationship constraints. Further, it also identified which of the column names is identified as the Primary key and which of the columns is identified as the Foreign Key.

In an implementation, the Compliance Module 126 retrieves the set of constraints from the Rules Data 132. The set of constraints may be customized based on the database vendor's specific implementations of database. For example, few database vendors permit a Primary Key and Foreign Key if the data types between the data type of the Primary Key is the same as that of the Foreign Key. Whereas, other database vendors identify compatible types, wherein the Primary Key and Foreign Key may be specified if the data types of the Primary Key and Foreign Key are compatible. It may be appreciated that there may be several variations in constraints for Primary Key and Foreign Key identification. The set of constraints is therefore configurable. In one implementation, the configured set of rules may be stored in the Rules Data 132.

In one implementation, the Database Relationship Identification System 102 provides a graphical user interface which can be used to update the set of rules. The graphical user interface may be provided with separate options to add, delete and modify rules. In one implementation, the graphical user interface may be provided with predefined constructs to define set of rules. The constructs may be selected in a sequence or dragged and dropped to construct one rule. For example, DATATYPE may be a construct to denote a data type. PK may be used as a construct to denote Primary Key. Other logical operators like |, &, and ! may be used to denote logical operators OR, AND, and NOT.

In another implementation, the constraints may be entered in a language that a user of the Database Relationship Identification System 102 is comfortable with. For example, the set of constraints may be defined in English and a translation engine associated with the Compliance Module 126 may use a translation engine to convert from English to a logical expression notation.

In one implementation, the Compliance Module 126 is used to configure the set of constraints during installation of the Database Relationship Identification System 102. In another implementation, the Compliance Module 126 may be used at anytime after the installation to append, modify, or delete some constraints from the set of constraints. In such a case, the Compliance Module 126 may be executed to check for compliance of the already identified Primary Keys and Foreign Keys against the set of constraints.

It may be understood from the above implementation, that one or more modules may be used independently or in combination for identifying the Primary Key and Foreign Key without deviating from the scope of the present subject matter.

FIG. 2 depicts the method implemented for identifying primary key and foreign key in a relational database. As explain earlier, the method may be executed for identifying a primary key and a foreign key while importing data from a legacy database in which specification of primary key and foreign key constraints was not possible. It may also be executed for databases where further primary key and foreign key constraints may be added to existing ones. This may occur when database structures are dynamically changing and new tables are being implemented.

At block 202, column name pairs are identified from the metadata of a database. The column name pairs form a universal set from which column name pairs which may be identified as primary key and foreign key are identified. The column name pairs may be identified from the metadata associated with the database. In an implementation, column name pairs are identified from different tables of the database.

In one implementation, all the column name pairs that can be identified where one column name belongs to one table and other column name belongs to another table are identified.

At block 204, the pair of column names is phonetically compared. In on implementation of phonetic comparison, the pronunciation of the column name is encoded into an alphanumeric result. The alphanumeric result of two phonetic strings is comparable to arrive at a phonetic disparity score which identifies a degree of mismatch in the pronunciation of pair of column names. Further a threshold level may be specified to denote an acceptable difference between strings.

One implementation of the phonetic algorithm is explained. The phonetic algorithm explained below may be implemented by the Phonetic Comparator 122. It may be appreciated that several variations of the phonetic algorithm are possible without differing from the scope of phonetic comparison.

1. Initially, similar sounding consonants are identified and grouped together, and each group of consonant is assigned a different score.
2. A column name pair is considered for performing a phonetic comparison
3. A result phonetic code is formed, which starts with the first alphanumeric character of each column name.
4. The column name is scanned for all occurrences of a, e, i, o, u, y, h, w, and they are removed from the column name.
5. Each of the remaining alphanumeric characters of the column name, excluding the first alphanumeric character, is considered.
6. The group of consonants that the each alphanumeric character belongs to is identified.
7. The code associated with the group of consonants to which the alphanumeric character belongs is appended to the result string, provided the conditions of steps 8, 9, and 10 are met.
8. If two adjacent alphanumeric character are represented by the same code, the code is entered only once in the result phonetic code.
9. If two alphanumeric character are separated by the one alphanumeric character which is either, h' or, w', then only one code is applied.
10. If earlier to step 4, two letters represented by the same code were separated by a vowel, then the corresponding code is entered twice in the result phonetic string.
11. The process from step 5 is repeated until at least 3 codes are entered in the result phonetic code, excluding the first alphanumeric character.
12. If the column name is too small to be represented by 3 codes, then 0 is appended in the result phonetic code until the result phonetic code size excluding the first letter is 3.

The following example is used to for providing greater clarity in understanding the algorithm described above. The grouping of consonants and the code associated with each group is as described below:

TABLE 4

| Consonants grouping | |
|---|---|
| Consonant | Code |
| b, f, p, v | 1 |
| c, g, j, k, q, s, x, z | 2 |

TABLE 4-continued

| Consonants grouping | |
|---|---|
| Consonant | Code |
| d, t | 3 |
| l | 4 |
| m, n | 5 |
| R | 6 |

Using the example explained earlier, the string "Employee Id" is chosen as the column name. The result code is represented with each step below 1. At the first step, Result phonetic code is assigned "E".
2. The letters u, o, e, and I are removed from the column name, thus the column name reads as Emplyd.
3. The letter m, according to the Table 3 above, is associated with code 5. Hence result phonetic code is assigned "E5". Since 3 codes are not appended into the result phonetic string, the process is continued.
4. The letter p, according to the Table 3 above, is associated with code 1. Hence result phonetic code is assigned "51". Since 3 codes are not appended into the result phonetic string, the process is continued.
5. The letter l, according to the Table 3 above, is associated with code 4. At this step, the result phonetic code is assigned "E514", and since 3 codes are now appended after the first letter in the result phonetic string, the process for the specified string "Employee Id" is terminated. The result phonetic code returned for "Employee Id" is E514.

Repeating similar steps as described above for the string "Emp Id", the result phonetic code is E513.

Further consider that the alphanumeric character threshold specified for phonetic comparison of column names is specified as 50. By using the implementation of the phonetic algorithm as described above, the alphanumeric code for 'Employee Id' is computed as 'E514' and alphanumeric code for 'Emp Id' is computed as 'E513'. Then a phonetic disparity score between the two strings may be computed as Phonetic disparity score=Result phonetic code ("Employee Id")—Result phonetic code ("Emp Id")

Phonetic disparity score=E514 —E513

With the above the phonetic disparity score may be computed as 1, which is less than the phonetic threshold level of 50, and hence according to this example, "Employee Id" and "Emp Id" are acceptable as strings that are phonetically sufficiently similar.

In one implementation, the pair of column names for which the strings are identified as phonetically sufficiently similar are added into a set called MATCHSET.

Several other implementations of phonetic algorithms may be used without differing from the scope of the above described method. The algorithm has been presented as one representative way of implementation. Alternatively, commercially available packages may be used perform the phonetic comparison.

At block 206, the strings of the column name pairs of the MATCHSET are compared to generate a string comparison score. String comparisons compare the characters of a string and the positions of the characters in the string. String comparisons provide information on whether the spelling of the column names is sufficiently matching.

In one implementation of the present subject matter, a string threshold level may be defined to specify an acceptable difference in the spellings of two strings. In the said implementation, the threshold level may be configurable.

1. A column name pair from MATCHSET is considered.
2. The first position of the first string is referred to as 'f1' and the position of the last character of the first string is referred to as t1 and is assigned the value of the length of the string.
3. Similarly, f2 is the first position of the second string, and t2 is the last position of the second string.
4. The characters of the first string and second string are compared by incrementing p1 and p2, until a position is reached where the character at p1 does not match the character at p2. At this stage, p1 and p2 represent the first unmatched character of the first string and second string respectively.
5. Similarly, character from the last position of the first string and second string are compared till a mismatched character is reached. Therefore, the positions t1 and t2 represent the first characters that mismatch, when comparison of characters starts from the end of the first string and second string.
6. For the remaining characters that do not match in both of the string a computation according to step 7 is performed to calculate distance between two strings.
7. A difference between the string sequences is computed based on whether the remaining characters of each string that do not match are vowels or consonants, and also the value of the position of the first characters that do not match, a string comparison score is computed which represents a percentage of match between the two strings. The following rules may be utilized for computing the difference based on string comparison. The difference between the first string and second string, referred to as d is initialized to 0.

a) The character at f1 and f2 are compared, if the characters match, then f1 and f2 are incremented. At this step d=d+0. If rule (a) is not complied, rule (b) is executed.

b) If character at f1 matches the character at f2+1 and if character at f1+1 matches the character at f2 and if character at f1+1 matches the character f2+2 and if character at f1+2 matches the character at f2+1, then rule (b) is complied and d is modified to (d+0.6). If rule (b) is not complied, then rule(c) is executed.

c) If character at f1 matches character at f2+1 and character at f1+1 matches character at f2, and if character at f1+2 matches character at f2+1, then rule (c) is complied and d is assigned (d+{0.5 if character at f1 is a vowel;1 if character at f1 is a consonant}).). If rule (c) is not complied, then rule (d) is executed.

d) If character f1 matches the character at f2+1, and if character at f1+1 matches the character at f2, and if character at f1+1 matches the character at f2+2, then rule (d) is complied and d is assigned (d+{0 if character at f2 is a vowel;1 if character at f2 is a consonant}). If rule (d) is not complied, then rule (e) is executed.

e) If character at f1 matches the character at f1+1, and if character at f1+1 matches the character at f2, and if character at f1+1 does not match the character at f2+1, then rule (e) is complied, d is assigned d++{0 if character at f2 is a vowel; 1 if character at f2 is a consonant}), and f1 is assigned f1+1. If rule (e) is not complied, then rule (f) is executed.

f) If character at f2 matches character at f2+1, and if character at f1 matches character f2+1 and if character at f1 matches character at f2+1 and if character at f1+1 does not match character at f2+1, the rule (f) is complied, d is assigned ++{0 if character at f2 is a vowel; 1 if character at f2 is a consonant}). F2 is assigned f2+1. If rule (f) is not complied, then rule (g) is executed.

g) If rules (a) to (f) are not complied, then if characters at f1 and f2 are both vowels, then d is assigned d+0.5. d is assigned d+1.

h) Rules (a) to (g) are applied until f1 is equal to t1 or f2 is equal to t2. The final value of d is the difference between the two strings.

The string comparison score is compared to the threshold value to identify whether the differences in the string is within the acceptable range. For example, a threshold value of 60% is assumed. If the string comparison algorithm while comparing two strings returns 30%, then it is assumed that the difference between the strings is acceptable and the strings are entered in TENTATIVELIST.

In the example previously considered, the pair of column names Employee Id, and Emp Id is considered. Characters in the $1^{st}$, $2^{nd}$, $3^{rd}$ positions of both strings match. However, the character in $4^{th}$ position is a mismatch. Starting from the last position of each string, the characters in the last position '1' matches. Further, the characters in position '1'-1 matches. The $2^{nd}$ string, that is Emp Id, has no more characters to match, and hence the distance computation between the strings 'd'=0.

Another example is considered for use of the string comparison algorithm. The other pair of strings Mobile number and Model number is considered. In this case, starting from the beginning of the string, characters in $1^{st}$ and $2^{nd}$ position match. However, the character in the $3^{rd}$ position is different.

Therefore, applying rules (a) to (g) described above, for the character at $3^{rd}$ position in the first string and second string, rule (g) is executed, and d=1. For the character at $4^{th}$ position, rule (g) is executed, and d=d+1, therefore d=2. Further for the character in the $5^{th}$ position, rule (a) is executed and therefore, d=d+0=2. For the character at the $6^{th}$ position of first string, there is no corresponding character to compare in the second string, and therefore rule (g) is executed and d=d+1, therefore d=3. That is the difference between the characters is considered as 3 out of the compare string length of 7. Therefore, based on the threshold set, the strings may be accepted.

In one implementation, a commercially available string comparison function may be used. One example of a commercially available algorithm is KDiff. However, several other string comparison functions may be used without deviating from the scope of the present subject matter.

At block 208, compliance of the identified column name pairs to a set of rules that is relevant for identifying primary key and foreign key is checked. During the compliance check, parameters of the metadata apart from the column name may also be used. Further, column values, and records of the tables of the database may also be considered.

A few rules that are checked for compliance is given below, however, it may be appreciated that the set of rules is not exhaustive. Further rules may be configurable to suit the specific requirement of the particular database.

1. If a column name pair is available in TENTATIVELIST, then the column name pair is considered. If the datatype corresponding to the columns has datatype CLOB or BLOB, then the column pair cannot be a primary key and foreign key and is removed from the TENTATIVELIST and step 1 is repeated.
2. Compatible datatypes are predefined for checking compliance. One example of a compatible datatypes is decimal, integer, and small integer. If the datatype of the columns corresponding to the column name are not identical datatypes and if the datatypes are not compatible according to the predefined compatible datatypes, then the column name pair is removed from the TENTATIVELST and step 1 is repeated.

3. Further, a length constraint may be set based on the specific implementation of the database by the database vendor. If the specific implementation does not allow for column length to be different, and if the column length of the columns corresponding to column names have different values, then the column name pair is removed from the TENTATIVELIST, and step 1 is repeated.

After repeatedly executing steps 1, 2, and 3 listed above, the TENTATIVELIST comprises column name pairs which are compliant to the general rules. From the columns corresponding to the column names pair in the TENTATIVELIST, the column which represents the primary key and the column which represents the foreign key have to be identified. The identification may be based on certain characteristics of the primary key and foreign key.

For identification of the primary key, compliance of the column to the following rules may be checked. One column out of the pair of columns corresponding to the column pair names in the TENTATIVELIST is identified for checking for primary key characteristics compliance.

1. The column values are not be repeating and each column value of the column are different from the other column values. Since primary key uniquely identifies a record in the table, the column values are checked for uniqueness. If the column values are not unique, then compliance to foreign key characteristics is checked.
2. None of the column values of the column identified have a NULL value. If a NULL value is found, then foreign key characteristics is checked.
3. Further, the table of the database from which the column has been selected should not already have a primary key identified. If another column has already been identified as a primary key in the table, then the column may not be identified as the primary key and may be removed from the TENTATIVELIST.

For identification of the primary key, compliance of the column to the following rules may be checked. One column out of the pair of columns corresponding to the column pair names in the TENTATIVELIST is identified for checking for primary key characteristics compliance.

Further, the following rules related to metadata may be used for checking compliance to primary key characteristics.

If a column has been defined with characteristic "Unique index" then it may be assumed that rule 1 of primary key characteristics is complied with. Several databases allow for specifying a column of a table with the "unique index" characteristic. Then when tables are being updated with a new record, or an existing record is modified, if a value in the column is repeated, then an error is indicated to the user.

If a column is defined with characteristic auto-increment type, then it may be assumed that rule 1 of the primary key characteristic is complied with. Auto increment characteristic updates the column value incrementally for each new record.

Another alternative to the characteristic auto-increment type is the sequence characteristic. In this type, the sequence may be specified or learnt. For example, if the column name is "Customer Id" and column value is "cust_$_5$", "cust_$_{10}$", and "cust_$_{15}$". When a new record is appended, then the last updated numeric value is incremented by 5, and the string "cust_" is appended with the updated numeric value.

A database characteristic that may be used for checking compliance with rule 2 of the primary key characteristic is the "not null" characteristic. In case the when new records are appended or existing records are modified, null values cannot be entered into the column for which "not null" is specified.

The rules for compliance to foreign key characteristics are that the foreign key may not be null. It may be appreciated that the rules disclosed for foreign key is not exhaustive. In one implementation, the set of rules for foreign key is configurable.

Once one column from the columns corresponding to the pair of column names in TENTATIVELIST is identified as primary key, then it may be concluded that the other key is the foreign key.

In one implementation, table 5 below may be used for identifying which column of the pair of columns corresponding to the pair of column names may be identified as primary key and foreign key. The table 5 depicts a conclusion that can be drawn based on the characteristics of each of the columns.

The constraints have not been defined exhaustively, and constraints may be modified, appended, or deleted to reach a representative set. The Table 5 depicts one implementation of identifying primary key and foreign key. It may be appreciated that several other implementations are possible without deviating from the scope of the present subject matter.

TABLE 5

Primary key and foreign key identification

| Column 1 | Column 2 | Conclusion (Primary key - PK; Foreign key - FK) |
|---|---|---|
| Has Unique Index defined | Is of Not Null type | PK: Column1 FK: Column2 |
| Is of AutoIncrement Type | Is of Not Null type | PK: Column1 FK: Column2 |
| Is of Not Null type | Is of AutoIncrement Type | PK: Column2 FK: Column1 |
| Has Sequence Defined | Is of Not Null type | PK: Column1 FK: Column2 |
| Is of Not Null type | Has Sequence Defined | PK: Column2 FK: Column1 |
| Has Unique Index defined | Has Unique Index defined | No decision |
| Is of AutoIncrement Type | Is of AutoIncrement Type | No decision |
| Has Sequence Defined | Has Sequence Defined | No decision |
| Does not have any constraint defined | Does not have any constraint defined | Eliminate such pairs. |
| Is of Not Null type | Is of Not Null type | No decision |

In table 5, a conclusion may not be arrived at based on the combination of characteristics of columns. For example, if both the columns corresponding to a pair of column names in the TENTATIVELIST have characteristic "auto increment", then it may not be possible to decide on the column which is the primary key and the column which is the secondary key. Other characteristics, such as whether a column value is null, may be taken into consideration to decide the column which corresponds to primary key and foreign key.

In one implementation, the identified primary key and foreign key may be presented to the user for the user to confirm the identified column pair as the primary key and foreign key.

In another implementation, the primary key and foreign key constraints are specified in the database based on the identification of primary key and foreign key using method 200.

We claim:

1. A computer implemented method to identify a primary key and foreign key relationship using metadata of a data source, the computer implemented method comprising:
   identifying a pair of metadata from the data source for comparison;
   identifying a phonetic code of each of the pair of metadata, wherein the phonetic code may be defined by a predefined phonetic rules;
   comparing the phonetic code of the pair of metadata to determine a phonetic disparity score, wherein the phonetic disparity score is indicative of a measure of phonetic difference between the pair of metadata;
   comparing a string sequence of the pair of metadata to determine a string comparison score, wherein the string comparison score is indicative of a difference in string structure of each of the pair of metadata;
   determining compliance of the pair of metadata to a predefined set of constraints; and
   determining the primary key and foreign key relationship based on the compliance of the pair of metadata, the phonetic disparity score, and the string comparison score.

2. The computer implemented method as claimed in claim 1, wherein the data source is relational database defined by a schema, wherein the schema comprises the metadata.

3. The computer implemented method as claimed in claim 1, wherein the metadata is the column name in the data source.

4. The computer implemented method as claimed in claim 1, wherein the predefined phonetic rules are in accordance to soundex algorithm.

5. The computer implemented method as claimed in claim 1, wherein the string structure is compared in accordance to kdiff algorithm.

6. The computer implemented method as claimed in claim 1, wherein the phonetic disparity score is compared to a phonetic threshold to determine whether the phonetic disparity score is within the phonetic threshold.

7. The computer implemented method as claimed in claim 1, wherein the string comparison score is compared to a string threshold to determine whether the string comparison score is within the string threshold.

8. The computer implemented method as claimed in claim 6, wherein the string sequence of the pair of metadata is compared based on the phonetic disparity score being within a phonetic threshold.

9. The computer implemented method as claimed in claim 1, wherein the predefined set of constraints is configurable based upon an implementation of the database.

10. The computer implemented method as claimed in claim 1, wherein for determining the pair of metadata as having primary key and foreign key relationship, the predefined set of constraints comprises a constraint that the number of column values of primary key column and foreign key column is equal.

11. The computer implemented method as claimed in claim 1, wherein the predefined set of constraints comprises at least a constraint to identify a column corresponding to one of the pair of metadata as primary key.

12. The computer implemented method as claimed in claim 11, wherein for identification of primary key, the predefined set of constraints comprises a constraint that each column value of the metadata is unique.

13. The computer implemented method as claimed in claim 1, wherein the predefined set of constraints comprises at least a constraint to identify a column corresponding to one of the pair of metadata as foreign key.

14. A Database Relationship Identification System to identify a primary key and a foreign key relationship using metadata of a data source, the Database Relationship Identification System comprising:
   a processor;
   a Schema Reader Module, coupled to the processor configured to identify a pair of metadata from the data source for comparison;
   a Phonetic Comparator, coupled to the processor, configured to determine a phonetic disparity score based on a comparison of a phonetic code generated for each of the pair of column names to determine the phonetic disparity score;
   a String Comparator, coupled to the processor, configured to determine a string comparison score based on difference in string structure of the pair of metadata;
   a Compliance Module, coupled to the processor, configured to determine compliance of the pair of metadata to a predefined set of constraints and determine whether the primary key and foreign key relationship exists between the pair of metadata, based on the phonetic disparity score, the string comparison score, and the compliance to the predefined set of constraints.

15. The Database Relationship Identification System as claimed in claim 14, wherein the predefined set of constraints are configurable based upon an implementation of the data source.

16. The Database Relationship Identification System as claimed in claim 15, wherein a graphical user interface is provided for configuring the predefined set of constraints.

17. A non-transitory computer readable medium having a set of computer readable instructions that, when executed, cause a Database Relationship Identification System that identifies a primary key and a foreign key relationship to:
   identify a pair of metadata from a data source for comparison;
   identify a phonetic code of each of the pair of metadata, wherein the phonetic code may be defined by a predefined phonetic rules;
   compare the phonetic code of the pair of metadata to determine a phonetic disparity score, wherein the phonetic disparity score is indicative of a measure of phonetic difference between the pair of metadata;
   compare string sequence of the pair of metadata to determine a string comparison score, wherein the string comparison score is indicative of a difference in a string structure of each of the pair of metadata;
   determine compliance of the pair of metadata to a predefined set of constraints; and
   determine the primary key and foreign key relationship based on the compliance of the pair of metadata, the phonetic disparity score, and the string comparison score.

* * * * *